US012679519B2

(12) United States Patent
Valerio

(10) Patent No.: US 12,679,519 B2
(45) Date of Patent: Jul. 14, 2026

(54) PRESSURE REDUCING SYSTEM FOR A BREATHING APPARATUS

(71) Applicant: HEAD WATERSPORTS S.P.A., Rapallo (IT)

(72) Inventor: Palmieri Valerio, Rapallo (IT)

(73) Assignee: HEAD WATERSPORTS S.P.A., Rapallo (IT)

( * ) Notice: Subject to any disclaimer, the term of this patent is extended or adjusted under 35 U.S.C. 154(b) by 648 days.

(21) Appl. No.: 18/309,672

(22) Filed: Apr. 28, 2023

(65) Prior Publication Data

US 2024/0017805 A1 Jan. 18, 2024

(30) Foreign Application Priority Data

Jul. 15, 2022 (IT) ........................ 102022000014974

(51) Int. Cl.
*B63C 11/22* (2006.01)
*A62B 7/02* (2006.01)
(Continued)

(52) U.S. Cl.
CPC ............ *B63C 11/2227* (2013.01); *A62B 7/02* (2013.01); *A62B 9/022* (2013.01); *B63C 11/186* (2013.01)

(58) Field of Classification Search
CPC ............. B63C 11/2209; B63C 11/2227; B63C 11/2236; A62B 7/02; A62B 7/04; A62B 9/02; A62B 9/022; A62B 9/06
See application file for complete search history.

(56) References Cited

U.S. PATENT DOCUMENTS 4,041,978 A 8/1977 Leemann
4,834,086 A * 5/1989 Garofalo ................ A62B 9/025 128/205.24

(Continued)

FOREIGN PATENT DOCUMENTS

CN 205323043 U * 6/2016 ............... A62B 9/02
EP 3978354 A1 * 4/2022 ......... B63C 11/2227
FR 2119191 8/1972

OTHER PUBLICATIONS

Machine translation of CN-205323043-U.*

(Continued)

*Primary Examiner* — Joseph D. Boecker
(74) *Attorney, Agent, or Firm* — MASCHOFF BRENNAN; Paul G. Johnson

(57) ABSTRACT

A pressure reducing system for a breathing apparatus may include a conduit and a mouthpiece. The system may also include a valve poppet operatively interposed between the conduit and the mouthpiece, the valve poppet being movable between a closed position and an open position. The conduit may include an abutment against which the valve poppet abuts in the closed position and from which the valve poppet is distanced in the open position, and the abutment may define an annular interface which in the closed position is in contact with the valve poppet. The system may also include a balancing chamber that defines a pressure balancing zone. The valve poppet may define a passage that places the conduit and the pressure balancing chamber in fluid communication and a section of said passage, in the open positions extends in the supply conduit beyond said annular interface.

11 Claims, 10 Drawing Sheets

(51) Int. Cl.
*A62B 9/02* (2006.01)
*B63C 11/18* (2006.01)

(56) References Cited

U.S. PATENT DOCUMENTS

| | | | | |
|---|---|---|---|---|
| 4,862,884 | A * | 9/1989 | Christianson | B63C 11/2227 128/204.26 |
| 5,803,073 | A * | 9/1998 | Toth | B63C 11/2227 128/205.24 |
| 7,171,980 | B2 | 2/2007 | Angelini et al. | |
| 2005/0279410 | A1 * | 12/2005 | Angelini | B63C 11/2227 137/505.42 |

OTHER PUBLICATIONS

Italian Search Report and Written Opinion as issued in connection with Italian Application No. 102022000014974, dated Feb. 28, 2023.

* cited by examiner

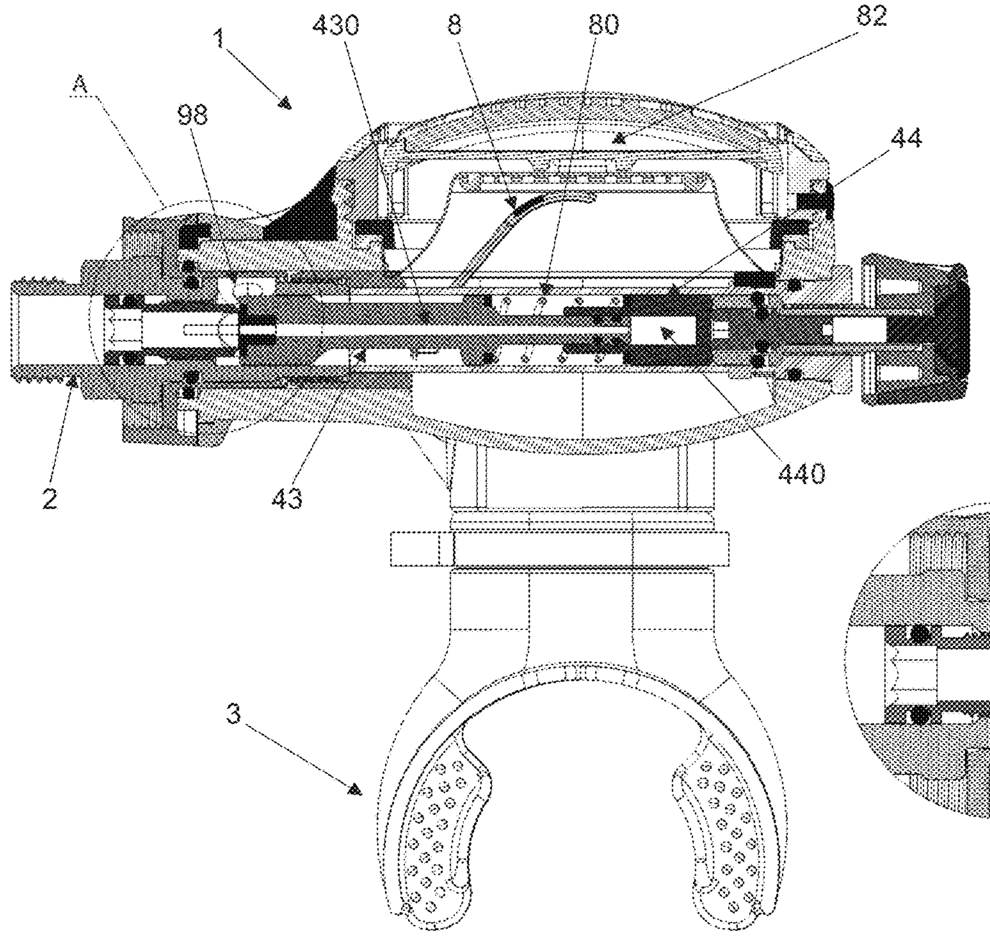
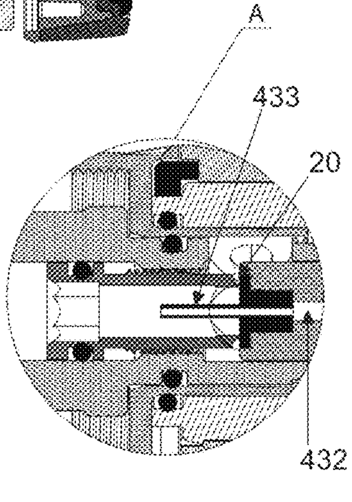
Fig. 9
Fig. 8

PRESSURE REDUCING SYSTEM FOR A BREATHING APPARATUS

FIELD

The present invention relates to a pressure reducing system for a breathing apparatus.

BACKGROUND

There are known breathing systems that comprise a cylinder of a pressurised breathable gas, downstream of which a first pressure reduction stage is provided; downstream of the first stage, at the regulator, the second pressure reduction stage is provided. The first reduction stage allows the breathable fluid to be brought from the pressure of 200-300 bar which is found in the cylinder to an intermediate pressure of about 10 bar in addition to the ambient pressure. The second stage further reduces the pressure, bringing it to the ambient value (a function of depth) so that the gas can be breathed in by the user.

U.S. Pat. No. 7,171,980 discloses a known solution in which in the second stage, a valve comprising a stem valve poppet is placed between a supply conduit of the breathable gas under pressure and a mouthpiece.

The stem has a first and a second opposite end and a central conduit connecting them. The first end is intended to prevent the passage of gas towards the mouthpiece whereas the second end leads into a pressure balancing chamber which is in a fixed position. The conduit thus allows the pressure in the balancing chamber to be balanced with the pressure at the valve inlet. Since the second end has a larger pushing surface than the first end, during use there is normally a force present that pushes the valve poppet against the valve inlet. In this manner the passage of the breathable gas towards the mouthpiece is prevented. Negative pressure induced by the user's breathing allows the movement of a diaphragm, which in turn activates a lever that moves the valve poppet away from the valve inlet, thus enabling the supply of the breathable gas to the mouthpiece.

This type of solution is known in the technical field as "upstream valve" because as the intermediate pressure increases, the valve closes more and more (unlike the downstream solutions which, as the intermediate pressure increases, open at a certain point without the need for external intervention; for this reason a second upstream stage needs an overpressure valve which discharges if the intermediate pressure reaches abnormal values due to a malfunction).

The upstream solution described above has some drawbacks, including that if the valve is open and an attempt is made to pressurise the second stage, there is a risk that the valve poppet will never be able to shut off the supply. This is because the balancing chamber, in order to be able to exert its action, needs the gas to penetrate therein and pressurise it sufficiently. If the valve poppet were open, the gas delivered would continue to push the first end of the valve poppet, preventing it from moving near the closed position. Furthermore, a good part of the gas would flow outside the valve poppet towards the mouthpiece without being able to flow through the conduit inside the valve poppet in an amount capable of pressurising the balancing chamber sufficiently.

An alternative solution is further known in which in the second stage, a valve comprising a stem valve poppet is placed between the supply conduit of the breathable gas under pressure and the mouthpiece.

The stem also has an inner central conduit connecting two opposite ends thereof. One of these ends (the first) faces the inlet of the valve and prevents/permits the passage of gas to the mouthpiece. The other end (the second) leads into and slides inside a pressure balancing chamber that is in a fixed position. The conduit thus allows the pressure in the balancing chamber to be balanced with the pressure at the valve inlet. Due to the ratios between the surfaces, the second surface end being smaller than the first (i.e., the situation opposite the case described above), the force exerted by the pressure in the balancing chamber only partly compensates for the force induced by the pressure at the valve inlet. In fact, there is an opposing helical spring that exerts an additional action directly on the stem of the valve poppet to press it against an inlet hole of the valve. The pressure present in the balancing chamber nonetheless helps the opposing spring to maintain the valve poppet in a position in which it prevents the passage of the breathable gas towards the mouthpiece. This configuration, with the spring participating in the closing of the valve, is called "downstream" in jargon, since as the intermediate pressure increases, a point is reached in which the valve opens without the need for external intervention.

Negative pressure induced by the user's breathing brings about a deformation of a diaphragm which in turn induces the shifting of a lever and the distancing of the valve poppet from the inlet hole (overcoming the forces which would compress the valve poppet against the valve inlet). In this manner, the breathable gas flows in a zone surrounding the valve poppet stem and reaches the mouthpiece.

In this solution, the spring is sufficient to keep the valve closed in the absence of pressure. However, the operation under conditions of high respiratory gas demands may be less stable than desired.

SUMMARY

A pressure reducing system for a breathing apparatus may include a conduit for supplying a breathable gas under pressure and a mouthpiece for inspiration of the breathable gas by a user. The pressure reducing system may include a valve poppet operatively interposed between the conduit and the mouthpiece. The valve poppet may be movable between: a closed position, in which the valve poppet prevents the passing of the breathable gas from the conduit to the mouthpiece, and at least one open position in which the valve poppet permits the passing of the breathable gas from the conduit to the mouthpiece. The conduit may include an abutment against which the valve poppet abuts in the closed position and from which the valve poppet is distanced in said at least one open position. The abutment may define an annular interface which in the closed position is in contact with the valve poppet in order to perform a fluid-dynamic sealing action that prevents the passing of the breathable gas from the conduit to the mouthpiece. The pressure reducing system may include a balancing chamber that defines a pressure balancing zone. The valve poppet may be at least in part interposed between the abutment and the balancing chamber. The valve poppet may define a passage that places the conduit and the pressure balancing chamber in fluid communication. The section of said passage, in at least one of said open positions extends in the supply conduit beyond said annular interface.

BRIEF DESCRIPTION OF THE DRAWINGS

Additional features and advantages of the present disclosure will become more apparent from the approximate, and thus non-limiting, description of a preferred but not exclusive embodiment of a pressure reducing system for a breathing apparatus as illustrated in the accompanying drawings, in which:

FIG. 8 shows a sectional view of a pressure reducing system in a downstream dispenser configuration;

FIG. 9 shows a detail section of the pressure reducing system of FIG. 8 analogous to the detailed section illustrated in FIG. 7;

DESCRIPTION OF EMBODIMENTS

The present disclosure relates to a pressure reducing system for a breathing apparatus. The pressure reducing system may be used for diving applications, preferably in the second pressure reduction stage. More in general the pressure reducing system could be employed in applications in which breathing takes place with the aid of a pressurized tank for accumulating a breathable gas (for example for moving around in underground environments or at the disposal of rescue teams that could find themselves operating in emergency zones).

As described, an alternative solution to some problems may include in the second stage, a valve comprising a stem valve poppet is placed between the supply conduit of the breathable gas under pressure and the mouthpiece. In this solution, the opposing helical spring, as described previously, is sufficient to keep the valve closed in the absence of pressure. However, the operation under conditions of high respiratory gas demands may be less stable than desired.

In this context, a technical task of the present disclosure may be to propose a pressure reducing system for a breathing apparatus that may help to overcome the above-mentioned drawbacks. Furthermore, it is an object of the present disclosure to provide a pressure reducing system for a breathing apparatus which is capable of avoiding unwanted operations if the pressure reducing system is pressurized in certain operating circumstances.

The stated technical task and specified objects may be substantially achieved by a pressure reducing system for a breathing apparatus comprising the technical features disclosed in one or more of the accompanying claims.

Turning to the figures, a pressure reducing system for a breathing apparatus is denoted by the reference number 1.

Figure 13:
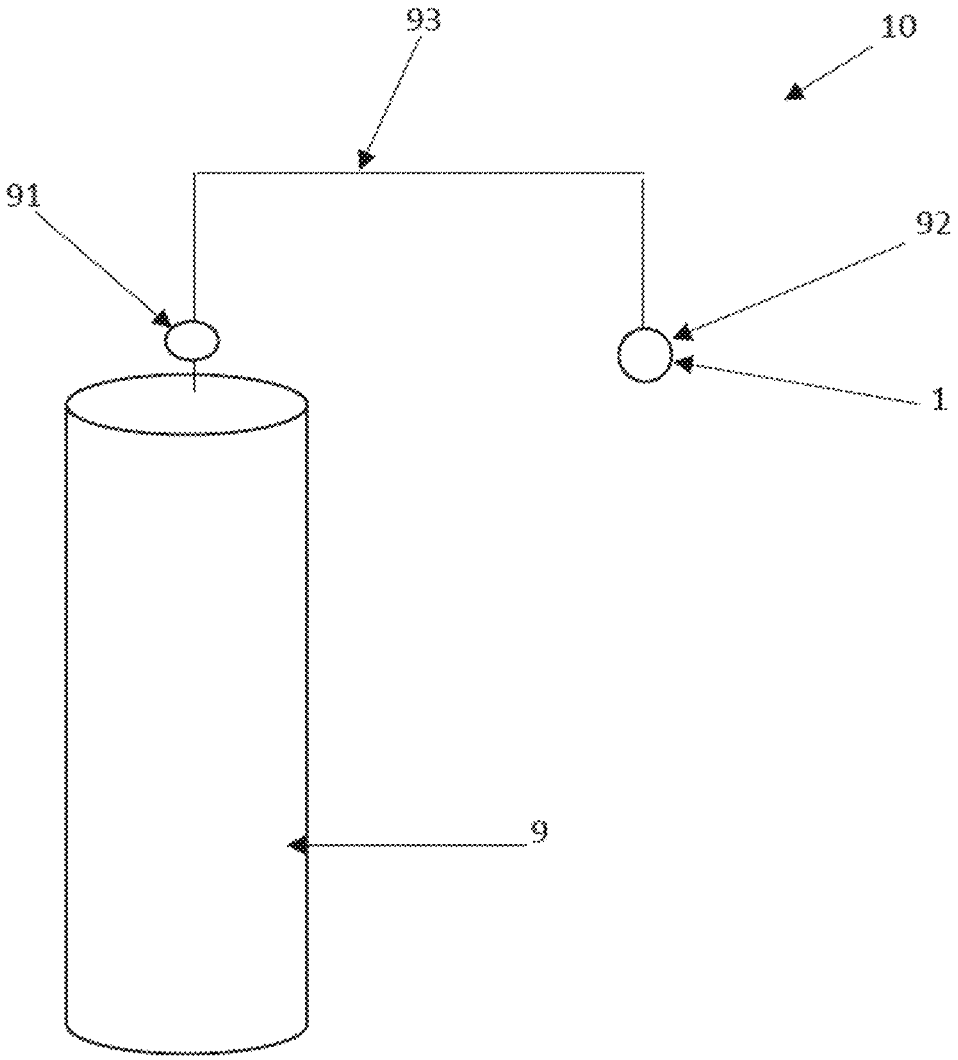
FIG. 13 shows a schematic view of a breathing apparatus according to the present disclosure, all arranged according to one or more embodiments of the present disclosure.

As mentioned previously, the pressure reducing system 1 is advantageously used for diving applications, but could also be employed in other applications. With reference to the schematic view in FIG. 13, the present description preferably makes reference to a breathing system 10 include a tank 9 of a breathable gas, a first pressure reduction stage 91 located downstream of the tank 9, a second pressure reduction stage 92 located downstream of the first stage 91, and a sleeve 93 (for example a sleeve or also a flexible hose) that connects the first stage 91 to the second stage 92 and inside which the gas moves.

The pressure reducing system 1 to which the present description relates may be applied to the second stage 92.

Appropriately, in the course of the present description, intermediate pressure is understood as the pressure between the first and second stages 91, 92 (and, therefore, in the preferred application, the pressure immediately upstream of the system 1). For example, the intermediate pressure can be equal to about 10 bar (though it may vary for example with depth).

The reducing system 1 comprises a supply conduit 2 for supplying a breathable gas under pressure. Such a supply conduit 2 typically originates from the sleeve 93 coming from the first stage 91 connected to the pressurised tank 9 of breathable fluid (the gas could also be in liquid form inside the tank 9). The breathable gas can be of various types: compressed air, Nitrox, mixtures of oxygen, nitrogen and helium, or still others.

The system 1 also comprises an inspiration mouthpiece 3 for a user to breathe in the breathable gas. This enables the user to keep the second stage firmly in their mouth and thus to breathe.

The system 1 further comprises a valve poppet 43 operatively interposed between the conduit 2 and the mouthpiece 3.

Figure 1:
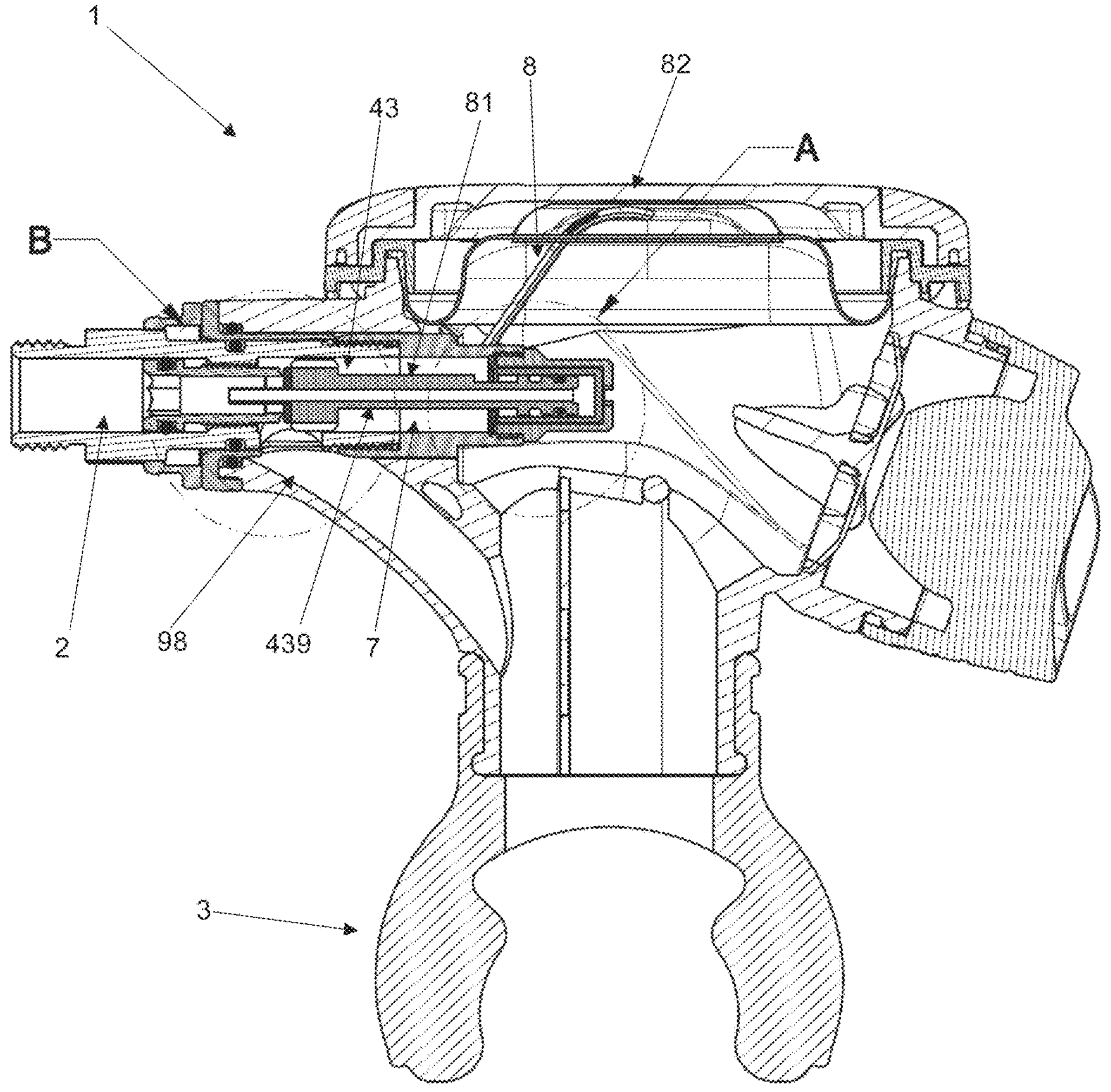
FIG. 1 shows a sectional view of a pressure reducing system in a first upstream, closed-valve configuration.
Figure 2:
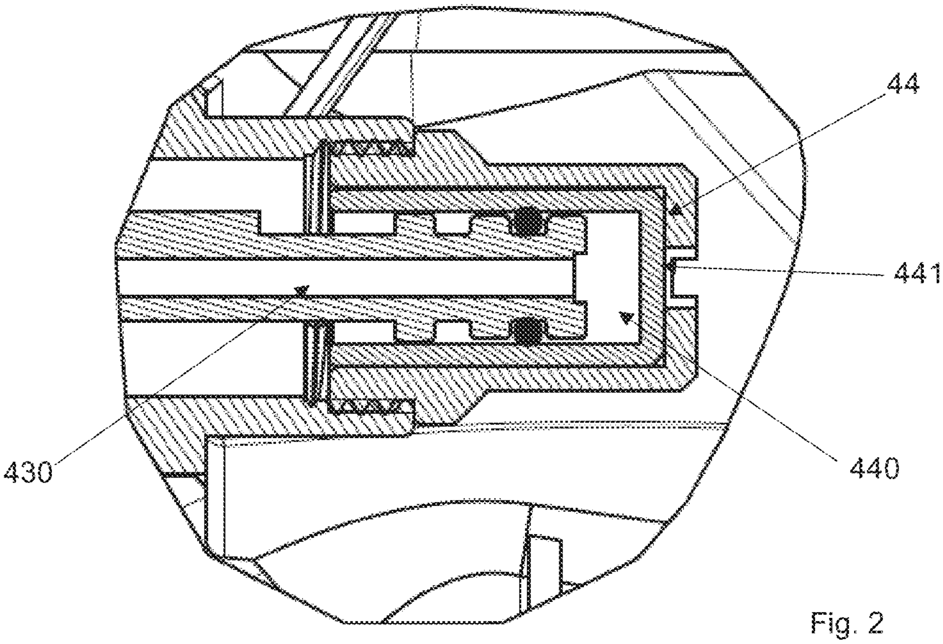
FIG. 2 shows a detailed section of the pressure reducing system of FIG. 1.
Figure 3:
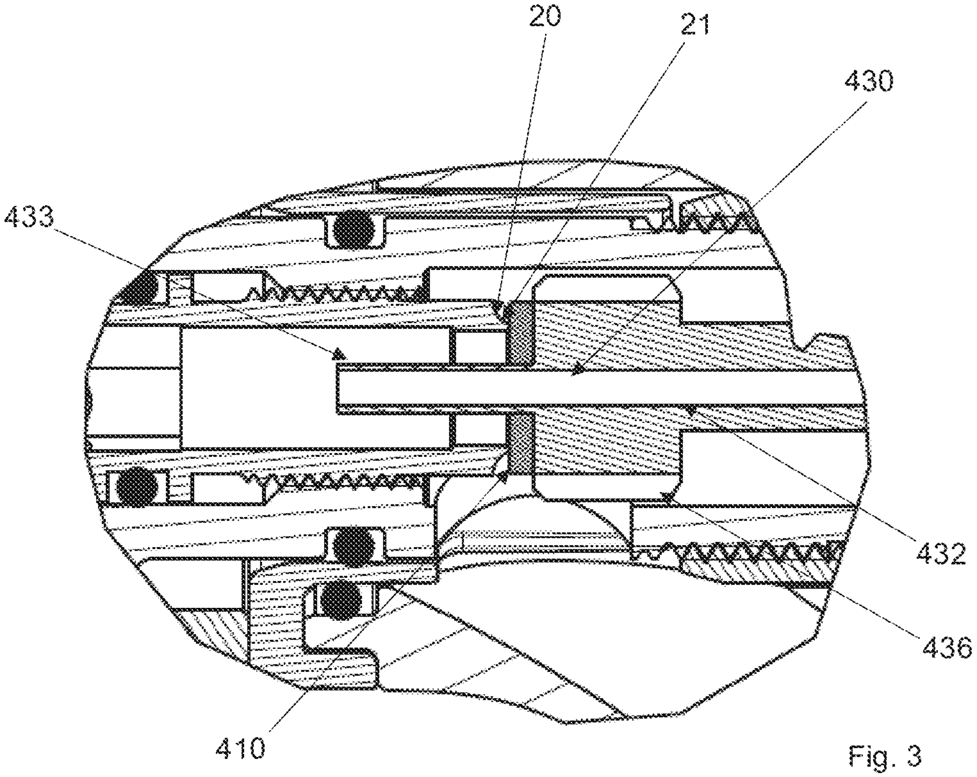
FIG. 3 shows a detailed section of the pressure reducing system of FIG. 1.
Figure 4:
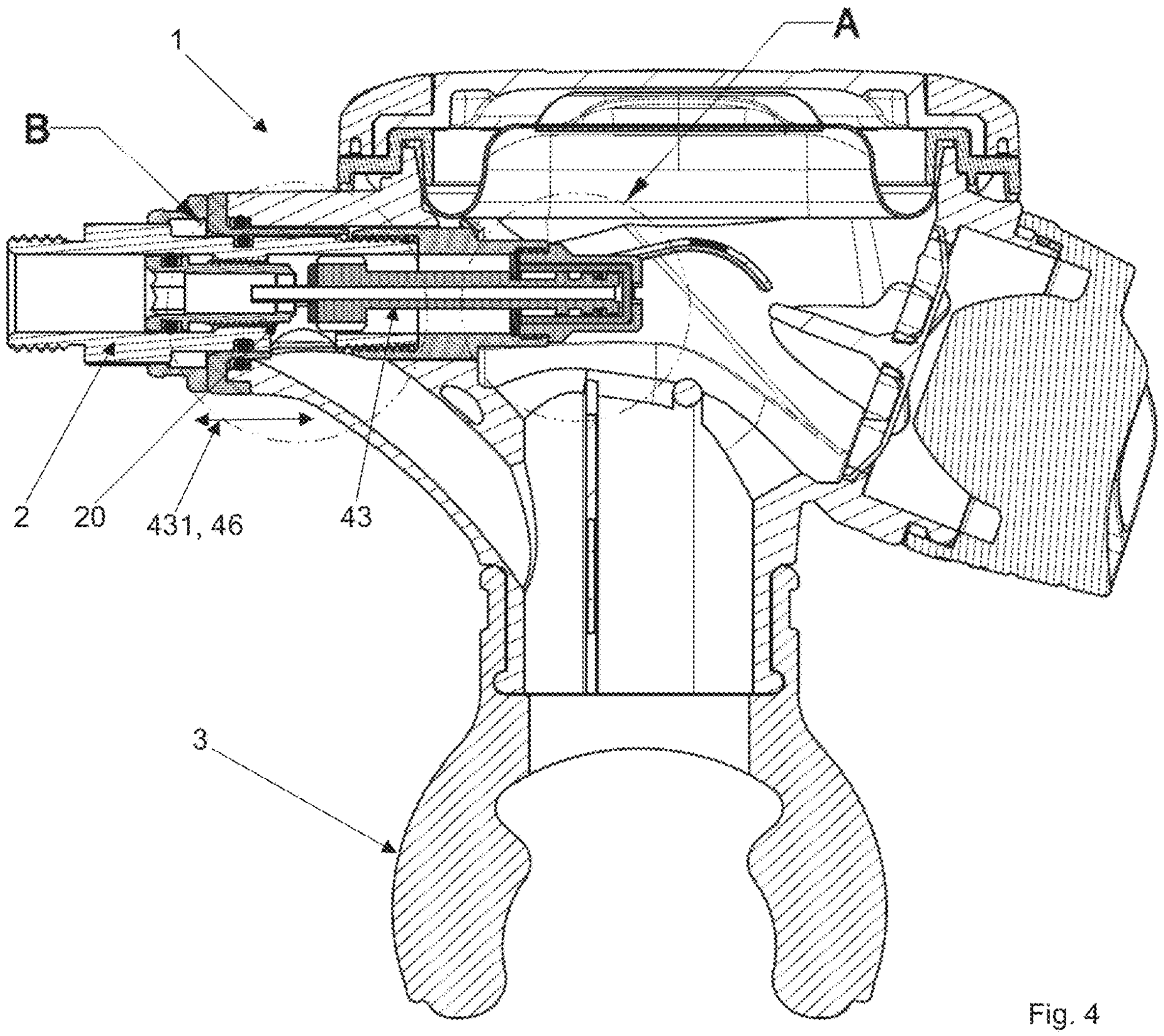
FIG. 4 shows a sectional view of the pressure reducing system in an open-valve configuration
Figure 5:
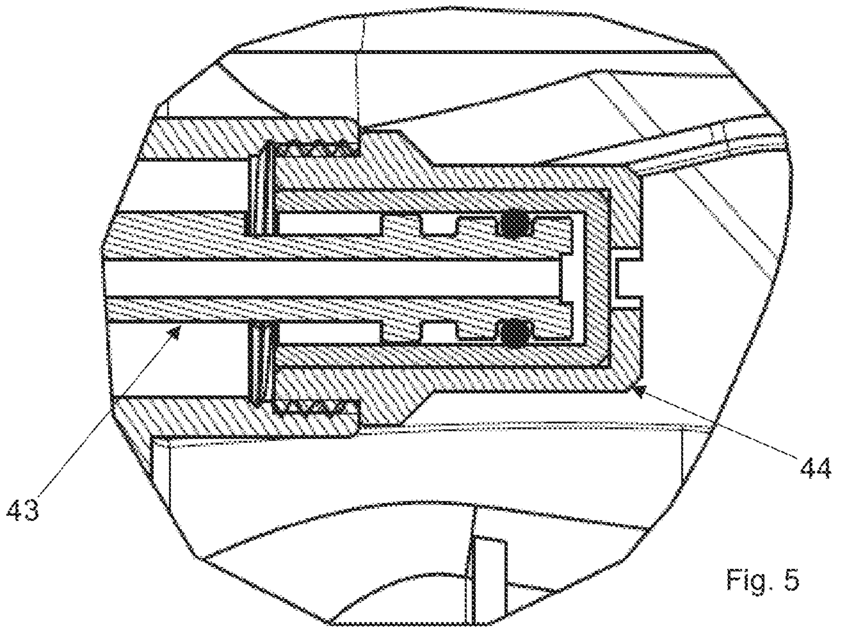
FIG. 5 shows a detailed section of the pressure reducing system of FIG. 4.
Figure 6:
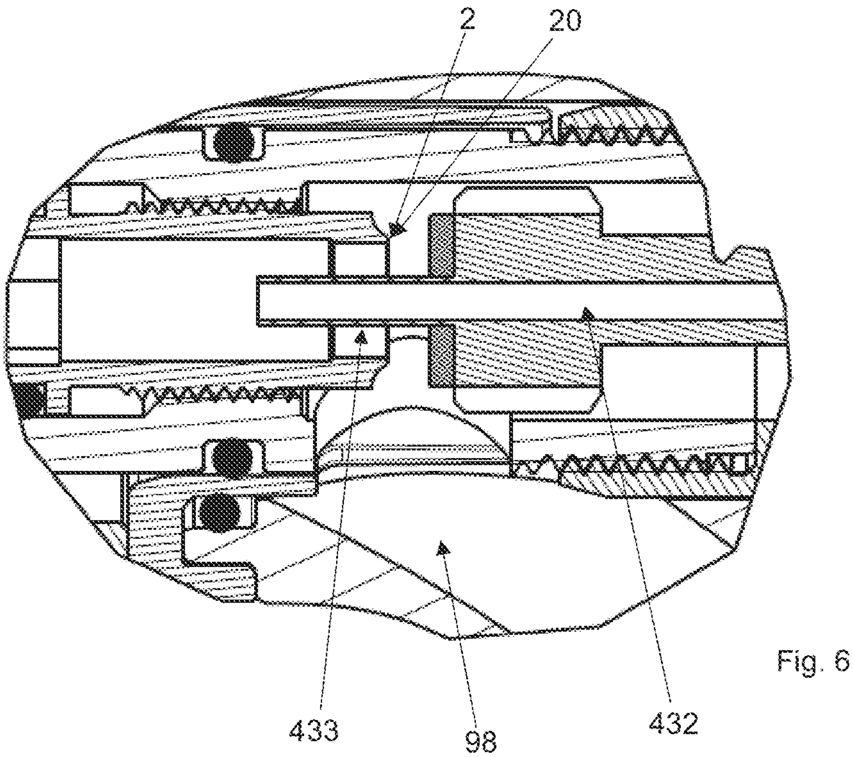
FIG. 6 shows a detailed section of the pressure reducing system of FIG. 4.
Figure 11:
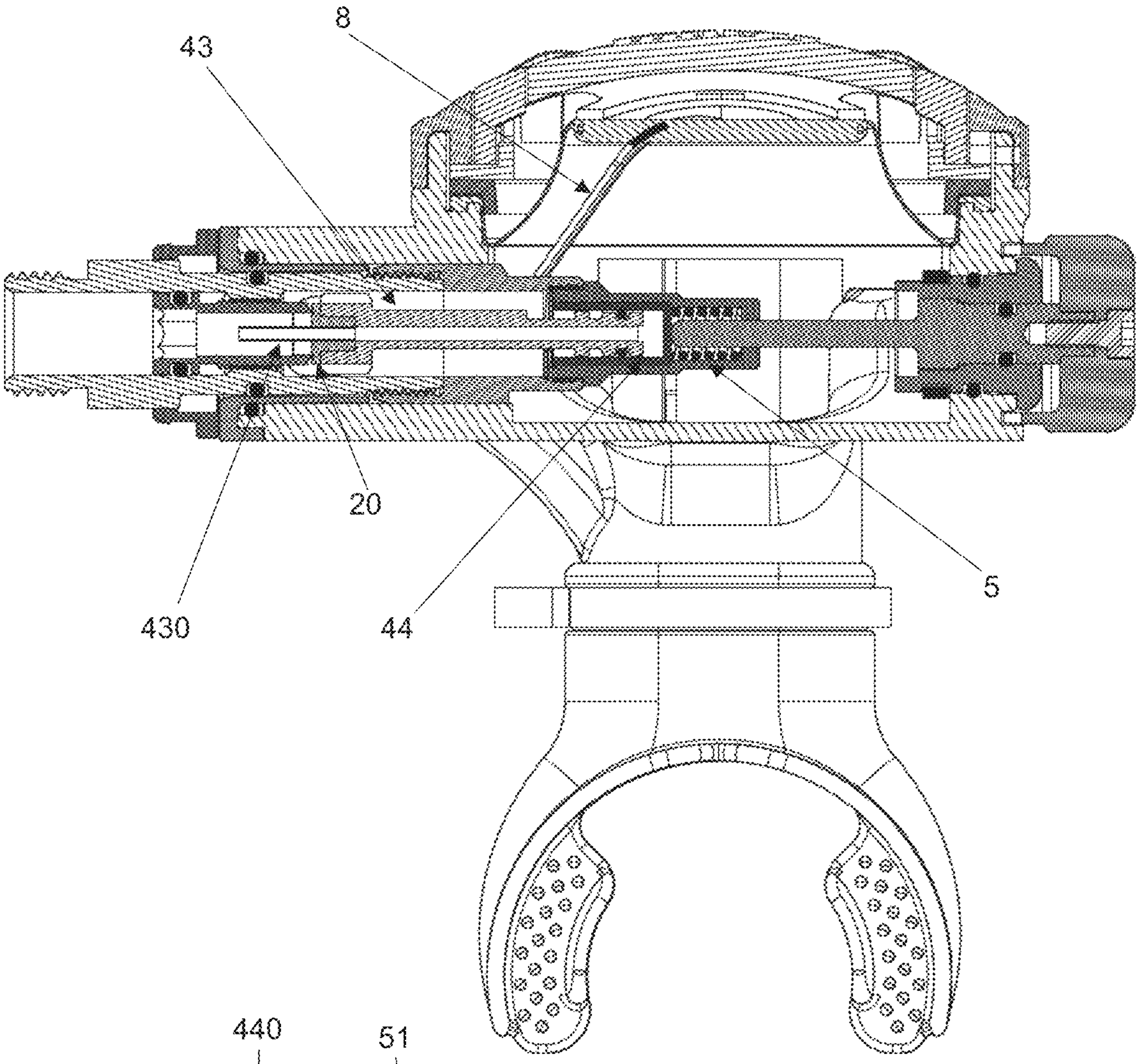
FIG. 11 shows a sectional view of a pressure reducing system in a second operating step phase.
Figure 11A:
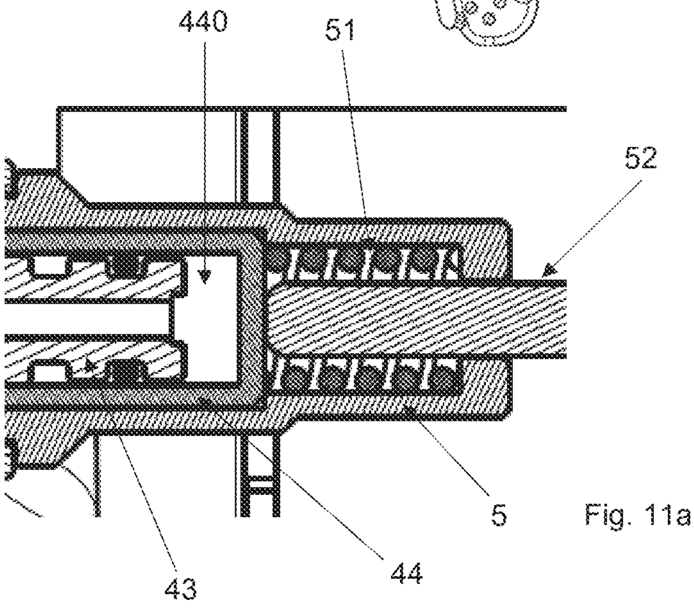
FIG. 11*a* shows a detailed section of the pressure reducing system of FIG. 11.
Figure 12:
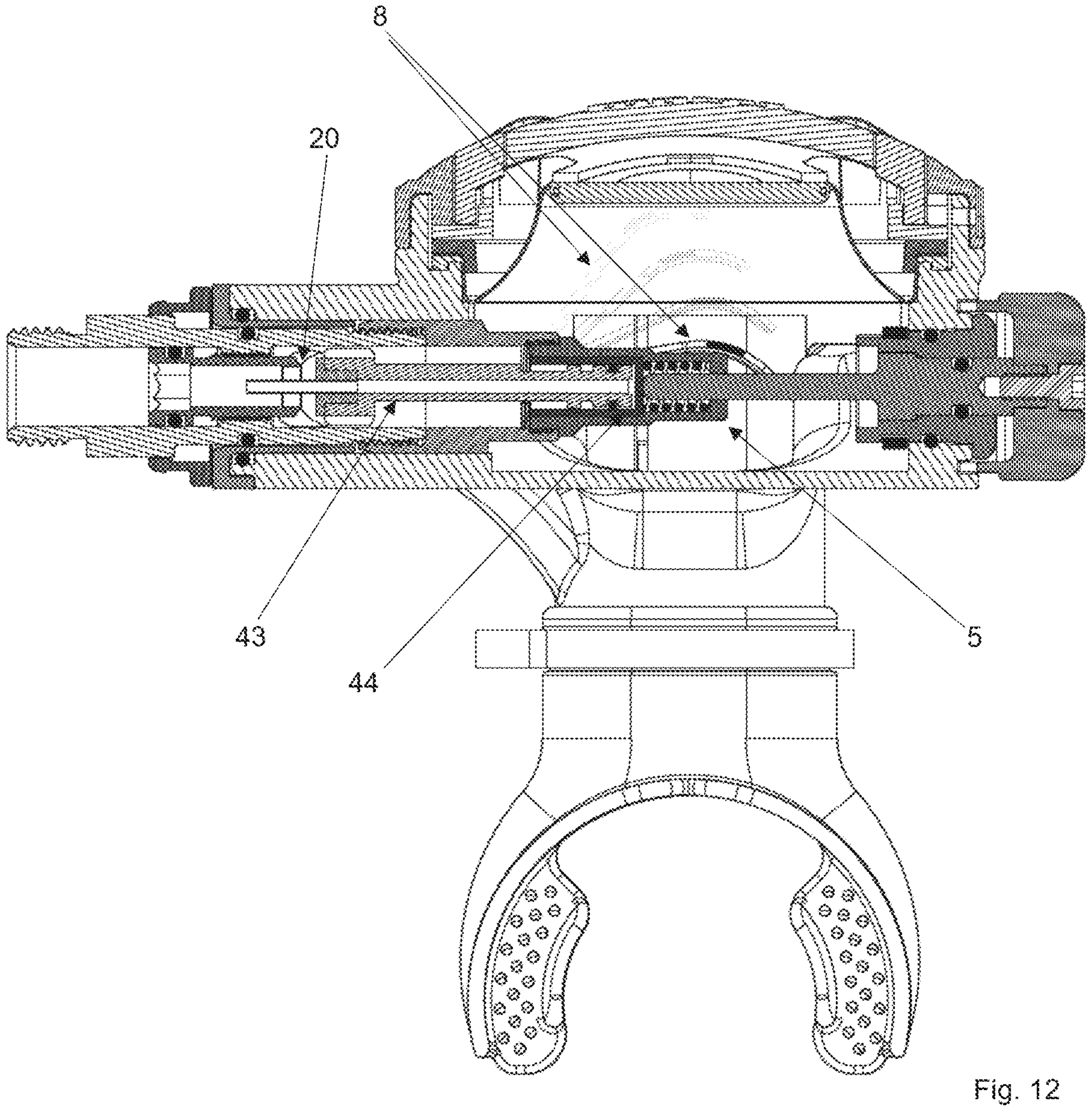
FIG. 12 shows a sectional view of a pressure reducing system in a third operating step phase.

The valve poppet 43 is movable between a closed position, in which it prevents the passage of the breathable gas from the conduit 2 to the mouthpiece 3 (see for example FIGS. 1, 3, 7, 8, 9, 10, 11) and at least one open position in which it allows the passage of the breathable gas from the conduit 2 to the mouthpiece 3 (see for example FIGS. 4, 6 and 12).

The conduit 2 comprises an abutment 20 against which the valve poppet 43 abuts in the closed position and from which it is distanced in said at least one open position. Suitably, the abutment 20 is located in a final section of the conduit 2. Suitably, the valve poppet 43 is located at an end of the conduit 2.

The abutment 20 defines an interface 21 that in the closed position is in contact with the valve poppet 43 in order to perform a sealing action that prevents the passage of the breathable gas from the conduit 2 to the mouthpiece 3. The interface 21 is annular. The interface 21 is located on an end surface of the abutment 20. Suitably, but not necessarily, it is circular. Suitably the interface 21 is transverse, advantageously lying in an imaginary plane which is transverse, preferably orthogonal, to a shifting direction 431 of the valve poppet 43.

Such a valve poppet 43 is therefore part of a valve that allows or prevents the passage of the breathable gas from the conduit 2 to the mouthpiece 3.

Suitably such a valve comprises an inlet (which can correspond to the abutment 20), an outlet (which can be a conduit 98 which is located downstream of said annular seal). Such a conduit 98 can be a by-pass conduit, shown by way of example in FIGS. 1, 6 and 8 and not further described, being well known in the technical field. Or such a conduit can be a conduit extending from a seat 7 which externally surrounds the valve poppet 43 (this solution is also well known in the technical field).

In a zone intended to come into contact with the abutment 20, the valve poppet 43 comprises a sealing element 410. Such a sealing element 410 is called "pad" in technical jargon. The abutment 20 can typically have a thin profile to optimise the seal with the pad. The abutment 20 against which the pad is pressed can therefore leave an imprint on the latter (called "marking" in technical jargon).

Conveniently, a sealing area between the conduit 2 and the valve poppet 43 is not located in a zone internal to the conduit 2.

Suitably the system 1 comprises a balancing chamber 44 which defines a pressure balancing zone 440. The valve poppet 43 is at least partly interposed between the abutment 20 and the balancing chamber 44. The valve poppet 43 defines a passage 430 which places the conduit 2 and the pressure balancing chamber 44 in fluid communication. The passage 430 is a tube/straw. The balancing chamber 44 is located behind the valve poppet 43 with respect to the flow of the breathable gas coming from the conduit 2.

The expression "balancing chamber" is well known in the technical field, as during operation it enables at least a partial balancing of the force exerted by the pressure of the breathable gas on the valve poppet 43 at the abutment 20.

The passage 430 extends inside the valve poppet 43. Purely by way of non-limiting example, the passage 430 can have an outflow cross section of a size comprised between 1 mm2 and 2 mm2.

When the valve poppet 43 is in the closed position, during normal operation the balancing chamber 44 takes on the pressure value existing at the abutment 20. This is thanks to the gas that flows from the conduit 2 to the balancing chamber 44 by means of the passage 430. When the valve poppet 43 is in the open position, the gas also flows outside the valve poppet 43 to the mouthpiece 3. For example in the open position the gas flows into a space interposed between the valve poppet 43 and the seat 7 which laterally surrounds the valve poppet 43 (solution not illustrated) or directly into the by-pass conduit 98 which is located immediately downstream of the valve poppet 43.

In the solution of FIGS. 1-7 the balancing chamber 44 remains in a fixed position. The valve poppet 43 moves from the closed position (see FIGS. 1, 3) to an open position (see for example FIGS. 4, 6) as a consequence of the negative pressure determined by the user on the mouthpiece 3 that calls gas to inhale it (as better explained below). Once the negative pressure induced by the user's breathing ends, the valve poppet 43 returns from the open position to the closed position due to the pressure exerted by the balancing chamber 44. In fact, in this step the pressure in the balancing chamber 44 is the same as the pressure in the conduit 2, but the force that causes the valve poppet 43 to close is greater than the one opposing it (as a consequence of the fact that the pushing surface that is usable in a closing direction of the valve poppet 43 is larger than the pushing surface that is usable in the opening direction; this is because inside the balancing chamber 44 the valve poppet 43 has a pushing surface for closing that is larger than the surface of the valve poppet 43 which in the closed position faces the section for the passage of gas at the abutment 20).

In the case of FIGS. 1-7 (upstream solution), suitably, an elastic spring is absent between the valve poppet 43 and the balancing chamber 44. In the solution of FIG. 8 (downstream solution) instead an elastic spring 80 is present between the valve poppet 43 and the balancing chamber 44. Such a spring 80 pushes the valve poppet 43 to assume the closed position.

One section of said passage 430, in at least one of said open positions extends in the supply conduit 2 beyond said interface 21.

A part of the passage 430 is surrounded by the abutment 20.

The valve poppet 43 is movable between the closed position and a position of maximum distancing from the interface 21. Advantageously, the passage 430 extends towards the supply conduit 2 beyond said interface 21 for at least 75% (but preferably for 100% and more) of the positions assumed between the closed position and the position of maximum distancing.

Suitably the passage 430 extends in the supply conduit 2 beyond said interface 21 in all of said open positions of the valve poppet 43. The annular interface 21 is an annular line or strip and the passage 430 crosses a hole defined by said annular interface in any open position of the valve poppet 43 (and consequently also in a closed position of the valve poppet 43).

The passage 430 extends towards the conduit 2 beyond the zone of the valve poppet 43 destined to abut the interface 21. Suitably, it protrudes cantilevered.

The system 1 comprises an actuator (a lever 8) for shifting the valve poppet 43 along a travel path having as opposite travel limits: the closed position of the valve poppet 43 and a position of distancing of the valve poppet 43 from the abutment 20 (reached without modifying the positioning of the balancing chamber 44).

Preferably the passage 430 extends in the conduit 2 beyond the interface 21 in any position of said travel path.

Conveniently, the reducing system 1 comprises a diaphragm 82 which is deformable by the user's breathing in. In fact, by breathing in, the user causes a negative pressure that deforms the diaphragm 82, causing it in turn to shift the lever 8. This in turn induces a shifting of the valve poppet 43 from the closed position to one of the open positions, thereby permitting the passage of the breathable gas. Once the effect of breathing in is over, the lever 8 goes back into the original position.

The valve poppet 43 has a preponderant extension direction 46. In fact, it is a stem valve poppet. It comprises a flat zone 81 which extends longitudinally, parallel to the preponderant extension direction 46. The flat zone 81 connects flaps 436 facing said abutment 20 and interaction means of the valve poppet 43 with the lever 8. The flat zone 81 has the purpose of minimising the risk of oscillations of the valve poppet 43 during opening. In fact, when the valve poppet 43 passes from the closed to the open position, the gas coming from the conduit 2 is introduced not only into the passage 430, but also flows outside the valve poppet 43. Every protuberance/wall of the valve poppet 43 perpendicular to the direction of flow outside the valve poppet itself acts like a "sail" which, when struck by the flow of gas, causes the valve poppet 43 to move rearward and disrupts the correct movement thereof. This can bring about undesirable uncertainties in the shifting of the valve poppet 43.

Conveniently one end of the passage 430 defines a breathing gas inlet port. This inlet opening is arranged transversely to the flow of breathing gas. This inlet opening faces a section of the conduit 2 located upstream of the valve poppet 43.

The valve poppet 43 suitably comprises a main portion 439 (which in the closing position does not extend beyond the annular interface 21).

In particular, the passage 430 comprises: a tubular portion 432 obtained in said main portion 439 and a tubular extension 433 outside the main portion 439.

Such a tubular extension 433 extends from the main portion 439 towards the conduit 2 (therefore upstream of the main portion 439 with respect to the direction of the gas in the conduit 2).

The tubular extension 433 outside the main portion 439 has a length comprised between 2 and 10 millimetres. By way of non-limiting example, the maximum shift of the valve poppet 43 with respect to the abutment 20 could be approximately 2 mm. Preferably the passage 430 extends from the sealing element 410 for about 7-9 mm, so as to have at least 5-7 mm for "drawing" the breathable gas.

Suitably, the tubular extension 433 extends cantilevered from the main portion 439. In particular, it extends cantilevered upstream with respect to the flow of the breathable gas in the conduit 2. Suitably the tubular portion 432 and the tubular extension 433 have the same passage section (or in any case they differ by less than 25%). Suitably the main portion 439 faces the abutment 20 and is entirely contained in one of the two half-spaces with respect to the imaginary plane in which the annular interface 21 lies. The tubular extension 433 crosses such an imaginary plane and extends upstream.

In the solution exemplified in FIGS. 1-6 the tubular extension 433 is in a single body with the inner tubular portion 432 of the valve poppet 43. In such a case the sealing element 410 (pad) can be a simple rubber ring fitted around the passage 430.

Figure 7:
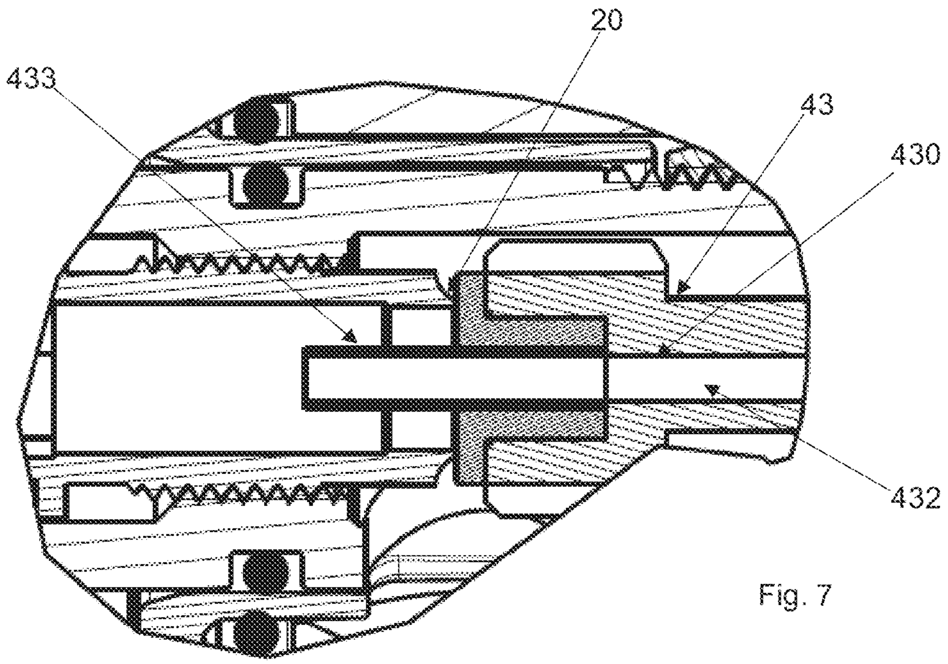
FIG. 7 shows another embodiment of the detailed section illustrated in FIG. 3.

In the solution exemplified in FIG. 7 and in the solution exemplified in FIGS. 8-9 the tubular extension 433 comprises a separate tube applied to the valve poppet 43. In particular, the separate tube is applied upstream of the tubular portion 432 obtained in the main portion 439. Suitably the separate tube and the tubular portion 432 are consecutive. For example the separate tube can be inserted into the sealing element 410 (pad) for a section.

The system 1 can comprise (see FIGS. 10-12) a movement system 5 for moving the balancing chamber 44 towards (up to) the abutment 20 to move the valve poppet 43 from the open position to the closed position upon the occurrence of at least one preset operating condition (typically depressurisation or blockage of the valve poppet 43 as a result of freezing).

Figure 10:
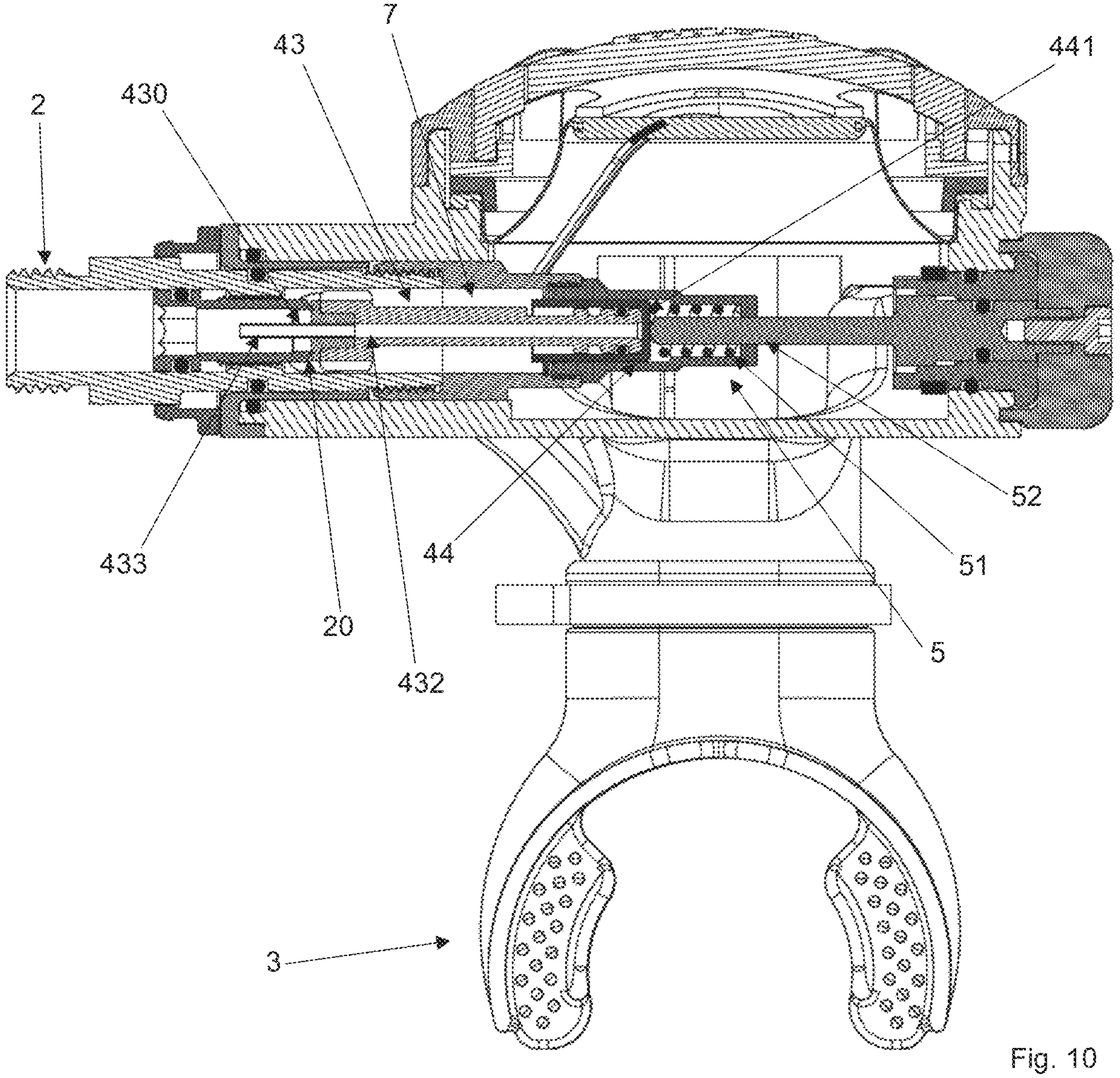
FIG. 10 shows a sectional view of a pressure reducing system in a first operating step phase.

In particular, FIG. 10 shows a situation in which there is a depressurisation upstream of the system 1. FIG. 11 instead shows the system 1 pressurised and with the valve poppet 43 in the closed position. When the pressurised system 1 and the user breathes, it generates a negative pressure that moves the lever 8 (as already explained above) which in turn causes the opening of such a valve poppet 43 (thus passing from the situation of FIG. 11 to that of FIG. 12).

As better explained below, the movement system 5 intervenes spontaneously if there is a depressurisation immediately upstream of the abutment (depressurisation of the second stage, typically occurs when the pressure immediately upstream of the abutment 20 is brought to "ambient pressure") or enables a manual intervention of the user in the occurrence of freezing which blocks the valve poppet 43 in the open position. In this case the movement system 5 pushes the balancing chamber 44, causing the passage from the situation of FIG. 12 to that of FIG. 10.

The balancing chamber 44 is therefore movable relative to the abutment (although the movement in actual fact only occurs under certain conditions). The movement system 5 induces the movement of the valve poppet 43 up to the closed position as a consequence of the push received from the balancing chamber 44 in its travel towards the abutment 20 (thus the movement system 5 pushes the balancing chamber 44, which in turn pushes the valve poppet 43). The balancing chamber 44 is conveniently shaped like a cup having an opening through which the valve poppet 43 is inserted. Conveniently, the end of the valve poppet 43 that extends into the balancing chamber 44 comprises an annular gasket (O-ring). During a travel of the balancing chamber 44 as it shifts towards the abutment 20, a back wall 441 of the balancing chamber 44 is intended to push the valve poppet 43 against the abutment 20 (this is exemplified in the passage from FIG. 12 to FIG. 10). Therefore, the system 1 can take on a configuration in which the back wall 441 of the balancing chamber 44 abuts against and pushes the valve poppet 43 towards the closed position. The balancing chamber 44 slides along the seat 7 under the action of the movement system 5. In particular, the balancing chamber 44 slides along the seat 7 parallel to a preponderant extension direction of the valve poppet 43.

The movement system 5 for moving the balancing chamber 44 can be of varying type. For example, behind the balancing chamber 44, the movement system 5 of the balancing chamber 44 could comprise a spring 51 and/or a manually operable pusher 52 (in case of emergency, e.g., freezing of the system 1) and/or a further pressurisation chamber, etc.

In the appended figures of the drawings, reference numeral 1 denotes a pressurisation method. Suitably, such a method is implemented by a pressure reducing system 1 having one or more of the features described above.

Suitably the pressurisation method is implemented starting from a configuration in which the valve poppet 43 is spaced from the abutment 20 and the system 1 is depressurised.

The method comprises the steps of supplying a breathable gas under pressure along the supply conduit 2 and intercepting at least a part of the gas by means of the passage 430 which extends beyond the interface 21 and conveying it to the balancing chamber 44. This causes a pressurization of the balancing chamber 44 (or in any case of the pressure balancing zone 440). This brings the valve poppet 43 into contact with the abutment 20. Thereby the passage of the breathable gas can be closed from the conduit 2 to the mouthpiece 3.

The present disclosure achieves important advantages.

The tube which exits from the valve poppet 43 in the direction of the sleeve (the conduit 2), allows to "draw" breathable gas before the breathable gas itself reaches the annular opening between the abutment 20 and the pad of the valve poppet 43, thereby managing to ensure pressurisation in the balancing chamber 44.

Thereby, even if the system 1 is pressurised with the valve poppet 43 open, the system manages to draw the breathable gas through such an extension and to convey it to the balancing chamber 44 to close the valve poppet (alternatively, if the breathable gas begins to flow directly towards the mouthpiece, the system 1 could go into continuous delivery, preventing the valve poppet 43 from closing).

The invention as it is conceived is susceptible to numerous modifications and variants, all falling within the scope of the inventive concept characterised thereby. Further, all the details can be replaced with other technically equivalent elements. In practice, all the materials used, as well as the dimensions, can be any whatsoever, according to need.

In accordance with common practice, the various features illustrated in the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A pressure reducing system for a breathing apparatus comprising:

a conduit for supplying a breathable gas under pressure;

a mouthpiece for inspiration of the breathable gas by a user;

a valve poppet operatively interposed between the conduit and the mouthpiece, the valve poppet being movable between:

a closed position, in which the valve poppet prevents passing of the breathable gas from the conduit to the mouthpiece, and at least one open position in which the valve poppet permits the passing of the breathable gas from the conduit to the mouthpiece, said conduit comprising an abutment against which the valve poppet abuts in the closed position and from which the valve poppet is distanced in said at least one open position, and said abutment defining an annular interface which in the closed position is in contact with the valve poppet in order to perform a fluid-dynamic sealing action that prevents the passing of the breathable gas from the conduit to the mouthpiece, the annular interface being located on an end surface of the abutment; and a balancing chamber that defines a pressure balancing zone, the balancing chamber during operation enabling at least a partial balancing of the force exerted by the pressure of the breathable gas on the valve poppet at the abutment, said valve poppet being at least in part interposed between the abutment and the balancing chamber; the valve poppet defining a passage that places the conduit and the balancing chamber in fluid communication even in the closed position of the valve poppet, wherein a section of said passage, in at least one of said open positions extends in the conduit beyond said annular interface; and wherein said passage extends in the conduit beyond said annular interface in all of said open positions of the valve poppet.

2. The pressure reducing system according to claim 1, further comprising an actuator for shifting the valve poppet along a travel path having as opposite travel limits:

the closed position; and a position of distancing reached without modifying the positioning of the balancing chamber, said passage extending in the conduit beyond the annular interface in any position of said travel path.

3. The pressure reducing system according to claim 1, further comprising a system for moving the balancing chamber towards said abutment in order to move the valve poppet from said at least one open position to the closed position upon the occurrence of at least one particular operating condition wherein no mechanical spring is present between the valve poppet and the balancing chamber.

4. The pressure reducing system according to claim 1, wherein said annular interface lies in an imaginary plane orthogonal to a shifting direction of the valve poppet.

5. The pressure reducing system according to claim 1, wherein said valve poppet comprises a main portion, and said passage comprises:

an inner tubular portion obtained in said main portion; and a tubular extension outside the main portion.

6. The pressure reducing system according to claim 5, wherein said tubular extension is in one body with said inner tubular portion.

7. The pressure reducing system according to claim 5, wherein the tubular portion and the tubular extension have the same passage section or they differ by less than 25%.

8. The pressure reducing system according to claim 1, wherein in a zone intended to come into contact with the abutment, the valve poppet comprises a sealing element; the abutment having a profile to optimise the seal with the pad.

9. The pressure reducing system according to claim 1, wherein:

inside the balancing chamber the valve poppet has a pushing surface for closing that is larger than the surface of the valve poppet which in the closed position faces the section for the passage of gas at the abutment; or an elastic spring is present between the valve poppet and the balancing chamber.

10. A breathing system comprising:

a tank of a breathable gas;

a first pressure reduction stage situated downstream of the tank;

a second pressure reduction stage situated downstream of the first stage and comprising a pressure reducing system; and a tube connecting the first stage to the second stage and in which the breathable gas moves, wherein the pressure reducing system includes:

a conduit for supplying the breathable gas under pressure;

a mouthpiece for inspiration of the breathable gas by a user;

a valve poppet operatively interposed between the conduit and the mouthpiece, the valve poppet being movable between:

a closed position, in which the valve poppet prevents passing of the breathable gas from the conduit to the mouthpiece, and at least one open position in which the valve poppet permits the passing of the breathable gas from the conduit to the mouthpiece, said conduit comprising an abutment against which the valve poppet abuts in the closed position and from which the valve poppet is distanced in said at least one open position, and said abutment defining an annular interface which in the closed position is in contact with the valve poppet in order to perform a fluid-dynamic sealing action that prevents the passing of the breathable gas from the conduit to the mouthpiece, the annular interface being located on an end surface of the abutment; and a balancing chamber that defines a balancing zone, the balancing chamber during operation enabling at least a partial balancing of the force exerted by the pressure of the breathable gas on the valve poppet at the abutment, said valve poppet being at least in part interposed between the abutment and the balancing chamber; the valve poppet defining a passage that places the conduit and the pressure balancing chamber in fluid communication even in the closed position of the valve poppet, wherein a section of said passage, in at least one of said open positions extends in the conduit beyond said annular interface; and wherein said passage extends in the conduit beyond said annular interface in all of said open positions of the valve poppet.

11. A method of pressurization, the method comprising:

providing a pressure reducing system that includes:

a conduit for supplying a breathable gas under pressure;

a mouthpiece for inspiration of the breathable gas by a user;

a valve poppet operatively interposed between the conduit and the mouthpiece, the valve poppet being movable between:

a closed position, in which the valve poppet prevents passing of the breathable gas from the conduit to the mouthpiece, and at least one open position in which the valve poppet permits the passing of the breathable gas from the conduit to the mouthpiece, said conduit comprising an abutment against which the valve poppet abuts in the closed position and from which the valve poppet is distanced in said at least one open position, and said abutment defining an annular interface which in the closed position is in contact with the valve poppet in order to perform a fluid-dynamic sealing action that prevents the passing of the breathable gas from the conduit to the mouthpiece; and a balancing chamber that defines a pressure balancing zone, said valve poppet being at least in part interposed between the abutment and the balancing chamber; the valve poppet defining a passage that places the conduit and the balancing chamber in fluid communication, wherein a section of said passage, in at least one of said open positions extends in the conduit beyond said annular interface;

when the valve poppet is distanced from the abutment and the pressure reducing system is depressurized, the method comprising the steps of:

supplying the breathable gas under pressure along the conduit; and intercepting at least a part of the breathable gas coming from the conduit through said passage which extends beyond said annular interface and conveying the part of the breathable gas to the balancing chamber in order to bring said valve poppet into contact with said abutment and close off the passing of the breathable gas from the conduit to the mouthpiece.

* * * * *